April 22, 1924.
W. N. DENNISON
TALKING MACHINE
Original Filed Aug. 18, 1909
1,490,916
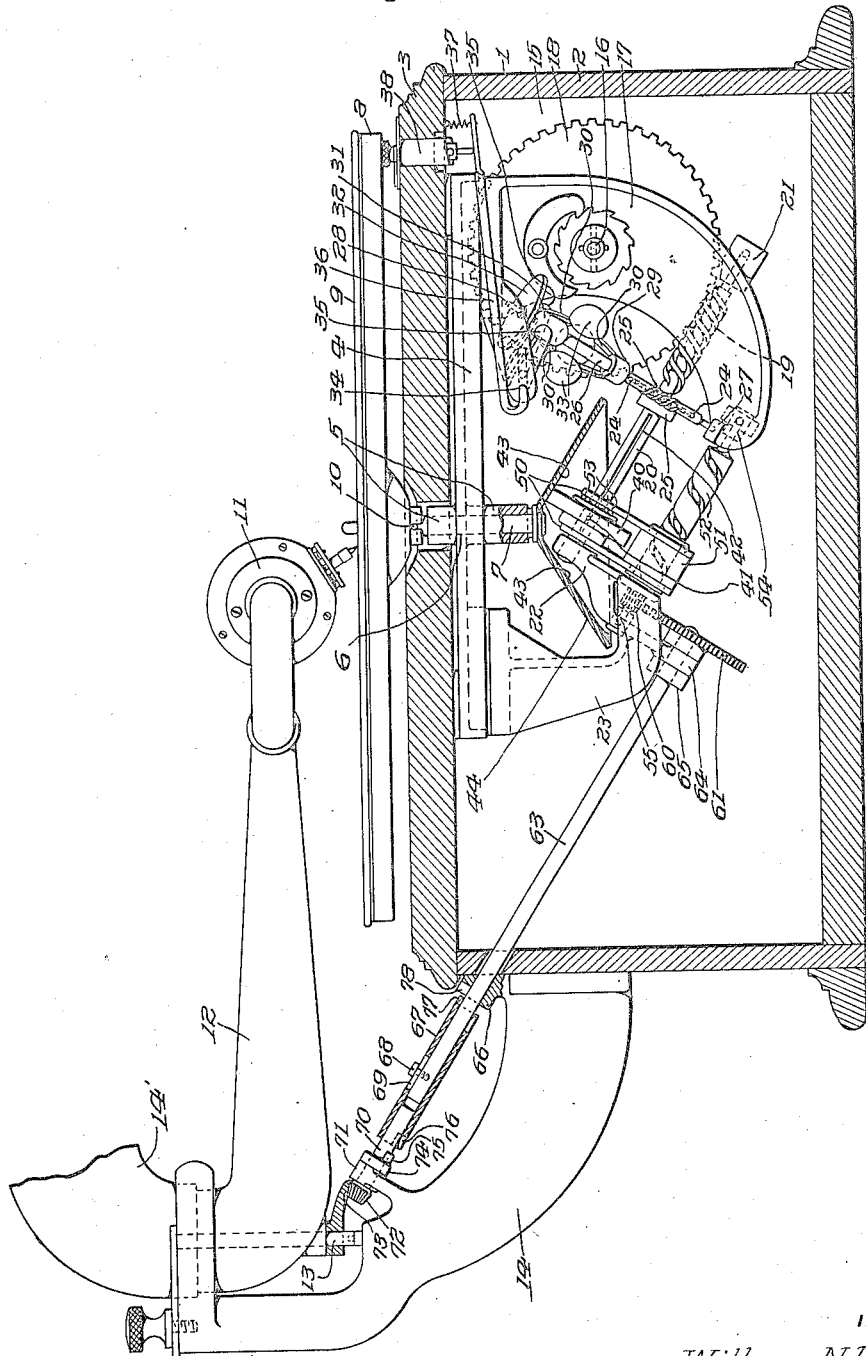
INVENTOR
Wilburn N. Dennison.
WITNESS
F. J. Hartman.
BY
ATTORNEYS Patented Apr. 22, 1924.

1,490,916

UNITED STATES PATENT OFFICE.

WILBURN N. DENNISON, OF NEW YORK, N. Y., ASSIGNOR TO VICTOR TALKING MACHINE COMPANY, A CORPORATION OF NEW JERSEY.

TALKING MACHINE.

Continuation of application Serial No. 513,382, filed August 18, 1909. This application filed August 27, 1917. Serial No. 188,436.

*To all whom it may concern:*

Be it known that I, WILBURN D. DENNISON, a citizen of the United States, and a resident of the city of New York, county of New York, and State of New York, have invented certain new and useful Improvements in Talking Machines, of which the following is a full, clear, and complete disclosure, reference being had to the accompanying drawing.

The main objects of this invention are, to provide a talking machine having a rotary record support, a sound recorder or reproducer adapted to cooperate therewith in contact with a sound record in the form of an undulatory spiral, and improved actuating mechanism for automatically imparting to the support a varying speed of rotation, the rate of rotation being at all times substantially inversely proportional to the distance of the reproducer or recorder from the center of the spiral, to give a uniform surface speed to the record in relation to the reproducer or recorder; to provide a talking machine, having a rotary record support, and actuating mechanism for automatically imparting to the support a constantly varying speed of rotation to give to a record carried by the support a uniform surface speed in relation to a recorder or reproducer cooperating therewith, and which may be adjusted for automatically imparting to the support a uniform speed of rotation; to provide a talking machine having a rotary record support freely movable axially and driven by a friction roller sustaining the weight of the support; and to provide other improvements as will appear hereinafter.

In the accompanying drawing, the figure is a side elevation partly in central longitudinal vertical section of a talking machine constructed in accordance with this invention.

Referring to the drawing, one embodiment of this invention comprises a case or cabinet 1, having a substantially rectangular body portion 2, and a substantially flat horizontal cover 3, superimposed thereon, and movable with respect thereto. Rigidly secured upon the under side of the cover 3 is a substantially flat rigid base plate 4, having an oppositely extending vertical lug 5, provided with a vertical central aperture 6, forming a bearing for a vertical axially movable rotary turntable shaft 7, which projects downwardly within the casing and upwardly centrally through the cover 3, of the casing, carrying upon its upper end the usual horizontal turntable 8, for supporting the usual disc sound record 9, the turntable being held against rotation with respect to the shaft 7 by means of a pin 10 extending through the shaft and engaging in a recess provided therefor upon the under side of the table.

Above the record support and adapted to cooperate therewith is a sound reproducer or recorder 11, of any suitable construction adapted to cooperate with the sound record 9, upon the record support. This sound reproducer or recorder is pivotally connected to the free front end of a rearwardly extending tubular sound conveying arm 12, the rear end of which is turned upwardly and is rotatably supported by a vertical pivot 13, rigid therewith, which is mounted to rotate upon a fixed axis upon the upper end of a bracket 14, the lower end of which extends forwardly and is rigidly secured to the rear side of the rear wall of the casing 1 of the machine. The tubular arm 12 may communicate with an amplifier section 15' arranged upon the bracket 14 as usual.

A spring motor 15, of any well known or suitable construction, having a substantially horizontal rotary drive shaft 16, is located transversely within the front portion of the casing, the drive shaft being preferably substantially parallel to the front of the casing and in front of and slightly below the lower end of the turntable shaft 7. One end of the drive shaft 16 journalled in the intermediate portion of a bracket 17, depending rigidly from the base plate 4. Upon the drive shaft 16 of the motor is rigidly fixed a worm gear 18 with which engages a worm 19 coaxial and rigid with the lower portion of an upwardly inclined transmission spindle 20, the lower end of which is journalled in a lug 21 rigid with the bracket 17, and substantially in vertical alinement with and below the drive shaft 16 of the motor. The upper end of the transmission spindle is journalled in an upwardly extending lug 22 rigid with the forwardly extending lower end of a bracket 23 depending rigidly from the plate 4, this lug being below and in proximity to the lower end of the turntable shaft 7.

For controlling the speed of the motor to give it a constant rate, a worm gear 24 is rigidly mounted upon the transmission spindle 20, above the worm 19, and meshes with a worm 25, rigid and coaxial with the lower end of an upwardly inclined governor spindle 26, the lower end of which is journalled in a bearing 27 upon the upper side of the rearwardly turned lower end of the bracket 17 and the upper end of which is journalled in a downwardly projecting lug 28, integral with the upper portion of the bracket 17.

The governor spindle 26 is provided as usual intermediate its ends with a fixed collar 29, to which is rigidly secured one end of each of a plurality of springs 30, the other ends of which are rigidly secured to a sleeve 31, which is longitudinally slidable upon the governor spindle and which carries coaxial and rigid therewith the usual friction disc 32, each spring having connected thereto intermediate of its ends, the usual weight or fly ball 33.

To control the speed of the governor, friction pads 35 are mounted upon a pivot 34 to swing upon a fixed axis adjacent and upon the under side of the friction disc 32, and are adapted to engage against the friction disc. Any well known means may be provided for adjusting the friction pads 35 in any desired fixed position to regulate the governor to a corresponding contant speed, for instance, the pivot 34 upon which the pads are rigidly mounted to oscillate may be extended and provided with a crank arm 36, the outer end of which is yieldingly held by means of a spring 37 between the arm and the casing, against the inner end of an adjusting screw 38 which extends through the cover of the casing, and is adapted to be rotated to adjust the pads.

For transmitting the energy of the constant speed motor 15, to the turntable 8, to drive the turntable at a constantly varying speed, the transmission spindle 20 of the motor is preferably arranged substantially in a plane with the axis of the turntable shaft 7, and a friction roller or disc 40 is mounted upon the upper portion of the transmission spindle 20 of the motor and is held against rotation with respect to the spindle by means of a key 41 fixed with respect to the roller but slidable longitudinally of the transmission spindle in a key-way 42, which extends longitudinally of the spindle to permit the roller to move axially or longitudinally of the spindle. This roller engages at its periphery against the internal conical surface 43 of a friction cone 44, which is mounted upon the lower end of the turntable spindle 7 rigid and coaxial therewith.

The internal conical surface 43 of the friction cone is inclined at an angle to a horizontal plane equal to the angle of inclination of the axis of rotation of the friction pulley 40, and the axis of rotation of the friction roller being in a plane with the axis of rotation of the friction cone 44, the periphery of the pulley will remain in contact with the inner surface of the friction cone as the roller is moved longitudinally of its axis without changing the position of the cone axially.

To insure a suitable pressure between the friction roller 40 and the friction cone 44, the shaft 7 of the turntable is free to move vertically in either direction carrying the turntable and friction cone therewith and the entire weight of the record, the turntable and turntable shaft, and the friction cone is supported through the friction cone by the friction roller. By this construction a sufficient pressure is always maintained between the friction roller and the friction cone to insure the rotation of the turntable.

For moving the friction roller 40 axially to vary the speed of the turntable, the roller is mounted between the two arms 50 which extend downwardly from the roller in a direction substantially perpendicular to the axis thereof and the outer ends of which are rigid with a nut 51, which is longitudinally movable upon a screw 52, arranged substantially parallel with and below the spindle 20, upon which the roller is mounted. Antifriction balls 53 may be arranged between the under side of the roller 40 and the upper side of the under arm 50 in a race-way provided therefor to receive the downward thrust of the roller, due to the weight of the parts resting thereon. The screw 52 is journalled at its lower end in a bearing 54, carried by the lower end of the motor bracket 17, and at its upper end in a bearing 55 rigid with the lower end of the transmission bracket 23.

For rotating the screw 52, a pinion 60 is rigidly mounted upon the upper end of the screw 52 and is engaged by a gear 61 rigid with the lower end of an upwardly and rearwardly inclined rotatable shaft 63, the lower portion of which is journalled in a lug 64, projecting downwardly and rearwardly from the lower portion of the transmission bracket 23. The shaft 63 is held in a fixed position longitudinally by means of the gear 61 which contacts against the under side of the lug 64, and a collar 65 upon the shaft, which contacts with the upper side of the lug. The upper end of the inclined shaft 63 projects through an aperture provided therefor in the upper portion of the rear wall of the casing and through a lug 66 which projects upwardly from the lower end of the sound arm bracket 14, and the shaft extends rearwardly from the lug and towards the pivot 13 supporting the sound arm.

For rotating the inclined shaft, 63, its upper end is provided with a sleeve 67 slidable longitudinally thereof, and held against rotation with respect thereto by means of a headed screw 68 threaded through a slot 69, extending longitudinally of the sleeve, and into the shaft 63, the head of the screw overlapping the edges of the slot so that the sleeve may be adjusted in a fixed position by tightening the screw. The sleeve 67 projects upwardly beyond the end of the shaft 63 and within the upper end of this sleeve is journalled the lower end of an upwardly and rearwardly inclined shaft 70, which is journalled intermediate of its ends into an upwardly and forwardly projecting lug 71, integral with the sound arm bracket 14.

Rigid with the upper end of this latter shaft 70 is a bevel pinion 72 which rests against the upper side of the lug 71, and engages a segmental bevel gear 73 rigid with the pivot 13 supporting the sound conveying arm 12. A collar 74 is fixed upon this shaft 70, in contact with the lower side of the lug 71, and the shaft 70 is thus held against longitudinal motion in one direction by the pinion 72 and in the opposite direction by the collar 74. A key 75 fixed upon the shaft 70 is adapted to engage in a slot 76 provided therefor in the upper end of the sleeve 67 when the sleeve is in its uppermost position, and the sleeve is provided upon its lower end with a downwardly projecting lug 77, which is adapted to engage a recess 78 provided therefor in the fixed lug 66 of the sound arm bracket 14, when the sleeve is in its lowermost position.

With this construction in mind, it is evident that in the operation of this improved talking machine the movement of the sound reproducer or recorder about its pivot 13 across the face of the record will rotate the inclined shaft 70, through the bevel action of the gear 73; and the bevel pinion 72, and when the sleeve 67 is in its uppermost position the rotation of the shaft 70 will be transmitted through the sleeve to the shaft 63 and in turn to the screw 52, whereby the friction roller 40 will be moved longitudinally of its axis toward the periphery of its friction cone as the sound reproducer or recorder is moved toward the center of the record. As the friction roller is rotated at a uniform speed by the constant speed motor the speed of rotation of the turntable will be at all times substantially proportional to the distance from the axis of the turntable of the point of contact between the roller and its friction cone.

The pitch of the screw 52 which moves the friction roller axially and the ratios between the diameters of the gears in the driving mechanism of the screw are so fixed that the movement of the sound reproducer or recorder 11 toward the axis of rotation of the record will cause a proportionally equal movement of the point of contact of the friction roller away from the axis of the friction cone, and the surface speed of the turntable or of the record carried thereby will be thus maintained substantially constant with respect to the sound reproducer or recorder.

It is also evident that when it is desired to have the turntable revolve at a substantially constant rate of rotation, it is only necessary to loosen the screw 68, holding the sleeve 67 and slide the sleeve downwardly into its lowermost position causing it to come into locking engagement with the lug 66, whereupon the friction roller 40 will be held fixed axially and when the motor is in operation will move the turntable at a uniform speed of rotation. By swinging the sound arm 12, toward or away from the axis of the turntable while the machine is in operation and while the sleeve 67 is adjusted to move the friction roller axially, the position of the roller may be adjusted so as to give, within the limits of the machine, any desired speed of rotation to the turntable and the motor may be stopped while the arm is held in this position, and the sleeve may then be lowered to change from a variable speed of rotation of the turntable to a constant speed of rotation at the rate corresponding to the position of the arm when the machine was stopped.

Although only a single form has been shown in which this invention may be embodied, it is obvious that many changes might be made in the construction illustrated without departing from the spirit of this invention or the scope of the appended claims.

This application is a continuation of my prior application, Serial No. 513,382, filed August 18, 1909.

Having thus described my invention what I claim and desire to protect by Letters Patent of the United States is:

1. In a talking machine in which the reproducer is impelled across the record by the sound record groove through the stylus in engagement therewith, the combination with a rotary record support, of a movable sound reproducer, a constant speed motor and means between the motor and the support and controlled by the sound reproducer when reproducing sound, for driving the support at a constantly varying rate of rotation while the motor is actuated at a constant speed.

2. In a talking machine, the combination with a rotary record support, of a sound reproducer mounted to move in relation to said support, and means controlled by said reproducer for imparting a constantly varying speed of rotation to said record support, said means including a conical surface and a roller engaging said conical surface.

3. In a talking machine, the combination with a disc record support mounted to rotate upon a fixed axis, of a constant speed motor, and means between the motor and the record support and sustaining the entire weight of said support for imparting a constantly varying speed of rotation to the support.

4. In a talking machine in which the reproducer is impelled across the record by the sound record groove through the stylus in engagement therewith, the combination with a record support mounted to rotate upon a fixed axis, of a sound reproducer mounted to move with respect to the axis of said support, a constant speed motor, and means between the motor and the record support, and controlled by said sound reproducer to give said support a constant surface speed with respect to said reproducer.

5. In a talking machine, the combination with a disc record support, of an arm pivoted adjacent to said support, a sound reproducer carried by said arm and adapted to cooperate with a record on said support, a constant speed motor, a segmental gear rigid and coaxial with said arm, and means between said motor and said support and controlled by said segmental gear for imparting to the said support a constant surface speed with respect to said reproducer.

6. In a talking machine in which the reproducer is impelled across the record by the sound record groove through the stylus in engagement therewith, the combination with a record support mounted to rotate about a fixed axis, of a movable sound reproducer, a constant speed motor and means between the motor and the support and controlled by the sound reproducer when reproducing sound, for driving the support at a constantly varying rate of rotation while the motor is actuated at a constant speed, said means being adjustable to permit of the rotation of said support at a constant rate by said motor.

7. In a talking machine, the combination with a rotary spindle, of a record support mounted thereon, a friction member fixed on said spindle, and a friction roller movable longitudinally of its axis of rotation and engaging said friction member and supporting and actuating said record support through the agency of said friction member and said spindle.

8. In a talking machine, the combination with a rotary record support, of a constant speed motor, a friction roller, and means having a conical surface engaged by said roller for rotating said support.

9. In a talking machine, the combination with a rotary spindle, of a record support mounted thereon, a friction member having a conical surface carried by said spindle, and a movable friction roller engaging said conical surface for rotating said support.

10. In a talking machine, the combination with a rotary record support mounted upon a fixed axis, of means for imparting a rotary movement to said support, comprising a member having a conical surface, and a friction roller engaging said conical surface and supporting the weight of said record support.

11. In a talking machine in which the reproducer is impelled across the record by the sound record groove through the stylus in engagement therewith, the combination with a rotary record support, of a sound reproducer, means for rotating said support, comprising an axially movable friction roller, and means actuated by said reproducer for automatically moving said roller axially to vary the speed of said support.

12. In a talking machine in which the reproducer is impelled across the record by the sound record groove through the stylus in engagement therewith, the combination with a rotary record support, of a movable sound reproducer mounted to cooperate with said support, and means to rotate said support, comprising a friction member having a conical surface, an axially movable friction roller engaging said surface, and means actuated by said reproducer for moving said roller axially.

13. In a talking machine, the combination with a rotary record support, of a movable sound reproducer mounted to cooperate with said support, and means to rotate said support, comprising an axially movable friction roller supporting the weight of said record support, and means actuated by said reproducer for moving said roller axially.

14. In a talking machine, the combination with a record support mounted to rotate upon a fixed axis, of a sound reproducer mounted to swing toward and away from said axis, an axially movable friction roller supporting the weight of said record support, and means actuated by said reproducer for moving said friction roller axially to give said support a speed of rotation substantially inversely proportional to the distance of the reproducer from the axis of the record support.

15. In a talking machine, the combination with a record support mounted to rotate upon a fixed axis, of a sound reproducer mounted to move toward and away from said axis, a constant speed motor, an axially movable friction roller actuated by said motor for rotating said record support, and means actuated by said reproducer for moving said roller axially to give said record support a constant surface speed with respect to said reproducer.

16. In a talking machine, the combination with a rotary record support, of a movable reproducer adapted to cooperate with said support, an axially movable friction roller for rotating said support, a carriage in which said roller is mounted, a screw engaging said carriage, and means actuated by said reproducer for rotating said screw to move said carriage together with said roller, axially of said roller to vary the speed of said record support.

17. In a talking machine, the combination with a rotary record support, of a movable sound reproducer adapted to cooperate therewith, an axially movable friction roller for rotating said support, and means actuated by said reproducer for moving said roller, said means being detachable from said reproducer, and said roller being held in a fixed position axially by the detachment of said means.

18. In a talking machine, the combination with a vertical shaft mounted to rotate upon a fixed axis, of a disc record support carried by the upper end of said shaft, a friction roller, means for rotating said roller, and means fixed on said shaft, and engaged and entirely supported by said roller, for rotating said shaft.

19. In a talking machine, the combination with a vertical shaft mounted to rotate upon a fixed axis, of a disc record support carried by the upper end of said shaft, a friction roller, and means having an under-surface engaged by said roller for rotating said shaft, said record support and said shaft being supported by said roller.

20. In a talking machine, the combination with a vertical shaft mounted to rotate upon a fixed axis, of a disc record support carried by the upper end of said shaft, a friction roller, and means having a conical under-surface engaged by said roller for rotating said shaft.

21. In a talking machine, the combination with a record support, of means for rotating said record support at a constantly varying speed, said means comprising a member having a conical surface and an axially movable friction roller mounted upon a fixed axis and engaging said conical surface.

22. In a talking machine, the combination with a rotary record support mounted to rotate upon a fixed vertical axis, of a friction member cooperating with said support and having a conical surface, an axially movable friction roller mounted to rotate upon an axis and engaging said conical surface, means to rotate said roller, and means to move said roller axially to change the speed of said record support.

23. In a talking machine, the combination with a rotary record support, of a movable sound reproducer adapted to cooperate with said support, a motor for rotating said support, and means controlled by said reproducer for changing the speed of rotation of said record support, said means comprising a rotatable shaft, a sleeve mounted upon one end of said shaft and adjustable longitudinally thereof but held against rotation with respect thereto, a second shaft coaxial with said first mentioned shaft, a key rigid with said second shaft and adapted to be engaged by said sleeve when said sleeve is moved in one direction from said first shaft, and a fixed member adapted to be engaged by said sleeve to hold said sleeve against rotation when said sleeve is moved in the opposite direction.

24. In a talking machine, the combination of a record support, a sound record on said support, a constant speed motor, means between said motor and said support including means controlled by said record for driving said support at a constantly varying rate of rotation, said last mentioned means being adjustable to drive said support by said motor at a constant angular speed of rotation.

25. In a talking machine, the combination with a record support, of an arm mounted to oscillate about a fixed axis, sound reproducing means carried by said arm, a constant speed motor, and means interposed between said motor and said support and controlled by said arm for imparting to said support a constantly varying speed of rotation, said speed varying means being adjustable to drive said support from said motor at a constant speed of rotation.

26. In a talking machine, the combination of a record support, a constant speed motor, a swinging arm, speed varying means interposed between said motor and said support, means to control said speed varying means directly from said swinging arm, and means to disconnect said last mentioned means to drive said support from said motor at a constant angular speed.

27. In a talking machine, the combination with a record support mounted to rotate on a fixed axis, of a member rotatable coaxially with said support and having a conical surface, a friction roller arranged to engage said conical surface to rotate said support, and means to rotate said roller.

28. In a talking machine, the combination with a record support mounted to rotate on a fixed axis, of a member rotatable coaxially with said support and having a conical surface, an axially movable friction roller arranged to engage said conical surface to rotate said support, and means arranged to rotate said roller to drive said support at a constantly varying speed of rotation.

29. In a talking machine, in which the reproducer is impelled across the record by the sound record groove through the stylus in engagement therewith, the combination with a record support mounted to rotate on a fixed axis, of sound reproducing means arranged to cooperate with said support, a friction roller movable longitudinally of its axis of rotation and arranged to rotate said support, and means actuated by said sound reproducing means for moving said roller longitudinally of its axis of rotation to rotate said support at a constantly varying speed of rotation, said means being adjustable to hold said roller against movement longitudinally of its axis of rotation to drive said support at a constant speed of rotation.

30. In a talking machine, the combination with a rotary record support mounted to rotate on a fixed axis, of a member rotatable coaxially with said support and having a conical surface, an axially movable friction roller arranged to engage said conical surface to drive said support, and means including a constant speed motor for rotating said roller and for moving said roller axially to drive said support at a constantly varying speed of rotation.

31. In a talking machine, the combination with a rotary record support mounted to rotate on a fixed axis, of a member mounted to rotate coaxially with said support and having a conical surface, an axially movable friction roller arranged to engage said conical surface to drive said support, and means including a constant speed motor for rotating said roller and for moving said roller axially to drive said support at a constantly varying speed of rotation, said means being adjustable to hold said roller in a fixed position axially and to rotate said roller to drive said support at a constant speed of rotation.

32. In a talking machine, the combination with a rotary record support, of a constant speed motor, a friction roller, and means having a concave conical surface engaged by said roller for rotating said support.

33. In a talking machine in which the reproducer is impelled across the record by the sound record groove through the stylus in engagement therewith, the combination with a rotary record support, of a movable sound reproducer, a talking machine motor, and means between said motor and said support and controlled by said reproducer during its movement when reproducing sound for driving said support at a constantly varying rate of rotation.

34. In a talking machine in which the reproducer is impelled across the record by the sound record groove through the stylus in engagement therewith, the combination with a rotary record support, of a movable sound reproducer adapted to cooperate therewith, an axially movable friction roller for rotating said support, and means actuated by said reproducer during its movement for axially moving said roller.

35. In a talking machine, the combination of a record support, a constant speed motor for driving said record support, a swinging arm, and speed varying means controlled by said arm to regularly vary the rate of rotation of said support.

36. In a talking machine, the combination with a freely swinging reproducer, a record support and a motor for driving said support, of power transmitting means interposed between said motor and said support for producing a constant linear speed of the turntable directly beneath said reproducer.

37. In a talking machine, the combination with a freely moving reproducer adapted to support a stylus, a turntable adapted to support a record, and a motor for driving said turntable, of power transmitting means interposed between said turntable and said motor for maintaining constant the linear speed of said record in engagement with said stylus.

38. In a talking machine in which the reproducer is impelled across the record by the sound record groove through the stylus in engagement therewith, the combination with a reproducer adapted to support a stylus, a turntable adapted to support a record, and a motor for driving said turntable, of power transmitting means interposed between said turntable and said motor and controlled by said reproducer for maintaining constant the linear speed of said record in engagement with said stylus.

39. In a talking machine in which the reproducer is impelled across the record by the sound record groove through the stylus in engagement therewith, the combination of a constant speed motor adapted to rotate a record support, with means, controlled by the reproducer and coacting with said record support for producing a constant linear speed of rotation of the record support relatively to said reproducer.

40. In a talking machine, the combination of means to rotate a record support, a record support rotated thereby, a reproducer, and speed varying means controlled by said reproducer for producing a constant linear speed of said record support relatively to said reproducer, said speed varying means being also adjustable to a fixed relation to rotate said record support at a constant angular velocity.

41. In a talking machine, the combination with a rotary record support, and a sound reproducer, the said support and reproducer being relatively movable, and means to rotate said support, of means to vary the rate of rotation of said support, including a movable friction roller and a member having a conical surface, and means to control the position of said roller dependent upon the relative position of said record support and reproducer.

42. In a talking machine, the combination of a record support, a sound reproducer co-operating therewith, said support and reproducer being relatively movable, means to rotate said support, including a member having a conical surface and a movable roller engaging said conical surface, and means controlled by the relative position of the sound reproducer and the support, to move said roller to constantly vary the speed of the rotation of said record support.

43. In a talking machine, the combination of a record support, a sound reproducer relatively movable with respect thereto, a motor for rotating said support, and means between said motor and said support controlled by the relative movement of said support and reproducer for constantly varying the angular speed of rotation of said support, said last-mentioned means being adjustable and operable to cause said motor to rotate said support at a constant angular speed of rotation.

44. In a talking machine, the combination with a rotary record support, of a constant speed motor to drive said record support, and speed varying means between said motor and said support to uniformly increase or decrease the speed of said record support while said motor is operating at a constant speed, said speed varying means comprising a cone, and a longitudinally movable frictional roller co-operating therewith.

45. In a talking machine, the combination with a sound reproducer, a motor, including a governor to maintain constant the speed of said motor, and a rotary disc record support, of motion transmitting means between said motor and said record support whereby said record support is rotated by said motor, said motion transmitting means including a speed varying mechanism operative to uniformly increase or decrease the speed of said record support and to maintain a constant linear speed of rotation of a record on said support under said reproducer during the transverse movement of said reproducer across a record on said support, and means to render said speed varying means inoperative to vary the speed of rotation of said record support, whereby said record support may be driven from the motor at a constant angular speed of rotation.

46. In a talking machine, the combination with a sound reproducer, a motor including a governor to maintain constant the speed of said motor, and a rotary disc record support, of motion transmitting means between said motor and said record support whereby said record support is rotated by said motor, said motion transmitting means including a speed varying mechanism operative to uniformly increase or decrease the speed of said record support and to maintain a constant linear speed of rotation of a record on said support under said reproducer during the transverse movement of said reproducer across a record on said support, and means to adjust said speed varying means to rotate said record support from said motor through said speed varying means at a constant angular velocity.

In witness whereof, I have hereunto set my hand this 24th day of August, A. D. 1917.

WILBURN N. DENNISON.